United States Patent
Drennan et al.

(10) Patent No.: US 8,321,327 B1
(45) Date of Patent: Nov. 27, 2012

(54) MAPPING AN OVER THE COUNTER TRADE INTO A CLEARING HOUSE

(75) Inventors: Jesse Robert Drennan, Lindenhurst, NY (US); Jerome Bayer, Oak Ridge, NJ (US)

(73) Assignee: ICAP North America, Inc., Jersey City, NJ (US)

( * ) Notice: Subject to any disclaimer, the term of this patent is extended or adjusted under 35 U.S.C. 154(b) by 121 days.

(21) Appl. No.: 12/774,053

(22) Filed: May 5, 2010

Related U.S. Application Data

(60) Provisional application No. 61/175,869, filed on May 6, 2009.

(51) Int. Cl.
G06Q 40/00 (2006.01)
(52) U.S. Cl. .......................................... 705/37
(58) Field of Classification Search ...................... 705/37
See application file for complete search history.

(56) References Cited

U.S. PATENT DOCUMENTS

| | | | |
|---|---|---|---|
| 5,983,203 A * | 11/1999 | Church et al. ................ | 705/35 |
| 7,110,972 B1 | 9/2006 | Handa et al. | |
| 7,266,521 B1 | 9/2007 | Handa et al. | |
| 7,451,105 B1 | 11/2008 | Doyle | |
| 8,024,255 B2 * | 9/2011 | Anguish et al. ................ | 705/37 |
| 8,103,578 B2 * | 1/2012 | Koblas et al. ................ | 705/37 |
| 2002/0091991 A1* | 7/2002 | Castro ........................... | 717/106 |
| 2002/0174066 A1* | 11/2002 | Kleckner et al. ............... | 705/39 |
| 2003/0033212 A1* | 2/2003 | Sandhu et al. ................. | 705/26 |
| 2004/0143536 A1 | 7/2004 | Haberle | |
| 2004/0153403 A1* | 8/2004 | Sadre .............................. | 705/39 |
| 2004/0172352 A1 | 9/2004 | Deretz | |
| 2005/0144061 A1 | 6/2005 | Rarity et al. | |
| 2005/0154666 A1 | 7/2005 | Angle | |
| 2006/0080216 A1 | 4/2006 | Hausman et al. | |
| 2006/0173771 A1 | 8/2006 | Johnston | |
| 2006/0224491 A1 | 10/2006 | Pinkava | |
| 2006/0224492 A1 | 10/2006 | Pinkava | |
| 2006/0224493 A1 | 10/2006 | Pinkava | |
| 2006/0224494 A1 | 10/2006 | Pinkava | |
| 2006/0253367 A1 | 11/2006 | O'Callahan et al. | |
| 2006/0253369 A1 | 11/2006 | O'Callahan | |
| 2006/0253370 A1 | 11/2006 | Feuser et al. | |
| 2006/0253383 A1 | 11/2006 | Cummings et al. | |
| 2006/0265301 A1 | 11/2006 | Chorna et al. | |
| 2006/0271461 A1 | 11/2006 | Chorna et al. | |

(Continued)

FOREIGN PATENT DOCUMENTS

AU 2005313866 A1 6/2006

(Continued)

*Primary Examiner* — Lindsay M. Maguire
(74) *Attorney, Agent, or Firm* — Dickstein Shapiro LLP

(57) ABSTRACT

A method and system converts OTC positions into contracts clearable at a futures clearing house. Each OTC position has a maturity date. The method comprises: a) defining a plurality of tenors. The plurality of tenors is fewer in number than the OTC maturity dates of the OTC positions. The method also comprises: b) defining a contract, which is clearable at the clearing house, corresponding to each tenor defined in step a); c) mapping each OTC position, as it is executed, into one or more of the contracts, based on the maturity date of the OTC position; and d) between business days, re-mapping each contract mapped at step c) to account for the move of calendar day. The invention finds particular application as a method and system to convert OTC Foreign Exchange (FX) positions into futures contracts clearable at a futures clearing house. The OTC FX positions may include OTC FX spot positions and OTC FX forwards positions.

21 Claims, 1 Drawing Sheet

U.S. PATENT DOCUMENTS

| | | | |
|---|---|---|---|
| 2007/0106583 A1 | 5/2007 | Hiatt et al. | |
| 2007/0118453 A1 | 5/2007 | Bauerschmidt et al. | |
| 2007/0118454 A1 | 5/2007 | Bauerschmidt et al. | |
| 2007/0118455 A1 | 5/2007 | Albert et al. | |
| 2007/0118456 A1 | 5/2007 | Glinberg et al. | |
| 2007/0118459 A1 | 5/2007 | Bauerschmidt et al. | |
| 2007/0118460 A1 | 5/2007 | Bauerschmidt et al. | |
| 2007/0136180 A1 | 6/2007 | Salomon et al. | |
| 2007/0203855 A1 | 8/2007 | Fisher | |
| 2007/0239589 A1 | 10/2007 | Wilson et al. | |
| 2007/0282734 A1 | 12/2007 | Huntley et al. | |
| 2008/0114702 A1 | 5/2008 | Hawrysz | |
| 2008/0120249 A1 | 5/2008 | Hiatt | |
| 2008/0120250 A1 | 5/2008 | Hiatt, Jr. | |
| 2008/0154790 A1 | 6/2008 | Hiatt | |
| 2008/0249958 A1* | 10/2008 | Anguish et al. | 705/36 R |
| 2008/0270284 A1 | 10/2008 | Cummings et al. | |
| 2009/0012892 A1 | 1/2009 | Biase | |
| 2009/0030822 A1 | 1/2009 | Cresswell | |

FOREIGN PATENT DOCUMENTS

| | | |
|---|---|---|
| AU | 2006297063 A1 | 4/2007 |
| CN | 101310298 A | 11/2008 |
| CN | 101331513 A | 12/2008 |
| EP | 1049037 A2 | 11/2000 |
| EP | 1388103 A1 | 2/2004 |
| GB | 2355556 A | 4/2001 |
| GB | 2375413 A | 11/2002 |
| GB | 2 437 661 A | 10/2007 |
| JP | 2002/207880 A | 7/2002 |
| JP | 2003/099621 A | 4/2003 |
| JP | 2003/099621 A1 | 4/2003 |
| JP | 2003/122255 A | 4/2003 |
| WO | WO-02/25546 A1 | 3/2002 |
| WO | WO-2004/068383 A1 | 8/2004 |
| WO | WO-2004066172 A2 | 8/2004 |
| WO | WO-2006/060880 A1 | 6/2006 |
| WO | WO-2006/103474 A2 | 10/2006 |
| WO | WO-2006/121948 A2 | 11/2006 |
| WO | WO-2007/035986 A2 | 4/2007 |
| WO | WO-2007/058684 A1 | 5/2007 |
| WO | WO-2007/061456 A1 | 5/2007 |
| WO | WO-2007/061617 A2 | 5/2007 |
| WO | WO-2007/061857 A2 | 5/2007 |
| WO | WO-2007/061961 A2 | 5/2007 |
| WO | WO-2007/061970 A2 | 5/2007 |
| WO | WO-2007/126870 A2 | 11/2007 |
| WO | WO-2008/063376 A1 | 5/2008 |

* cited by examiner

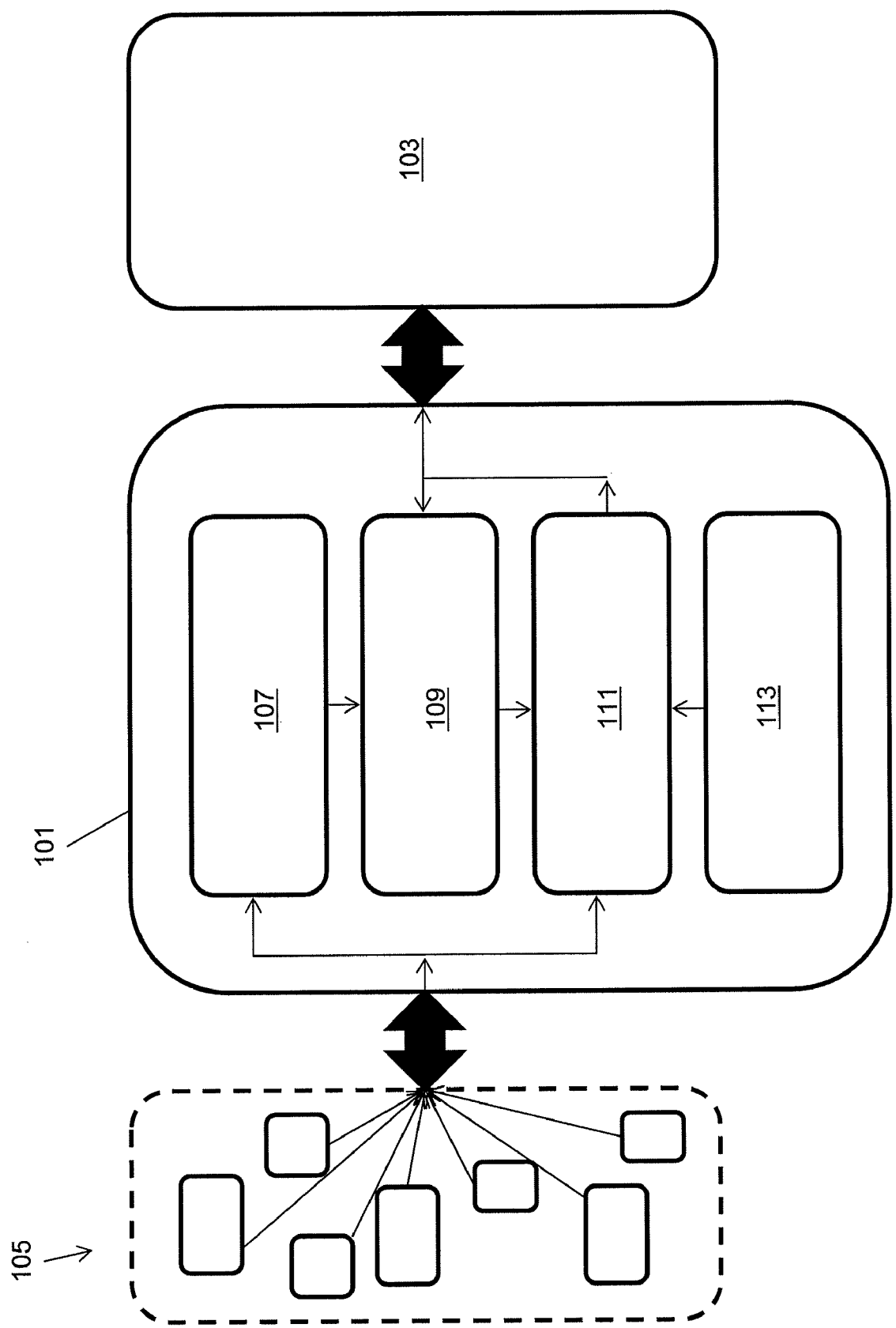

MAPPING AN OVER THE COUNTER TRADE INTO A CLEARING HOUSE

CROSS-REFERENCE TO RELATED APPLICATION

This application claims benefit under 35 U.S.C. §119(e) to U.S. Provisional Application No. 61/175,869, filed May 6, 2009, which is hereby incorporated by reference.

FIELD OF THE INVENTION

This invention relates to a method and system for conversion of Over the Counter (OTC) positions into contracts clearable at a clearing house. In particular, this invention relates to a method and system for conversion of OTC Foreign Exchange (FX) positions into futures contracts clearable at a futures clearing house.

BACKGROUND OF THE INVENTION

OTC markets allow one party to buy and sell items directly with a counterparty, without a central exchange. A central party may facilitate market making on an OTC platform but is not involved in any executed trade. An OTC contract is a bilateral contract in which the two parties agree on how a particular trade or agreement is to be settled in the future. The FX market is one example of an OTC market. Spot, forwards and swaps are examples of OTC contracts.

On the other hand, exchange-traded contracts are standardized by the exchanges where they trade and the clearing houses at which they settle. A clearing house is a financial services company that provides clearing and settlement services for financial transactions on an exchange. The contract sets out the asset that is to be bought or sold, and how, when, where and in what quantity it is to be delivered. One example of a standardized contract traded on an exchange and cleared at a clearing house is a futures contract. A futures contract is a contract to buy or sell a standardized quantity of a specified commodity of standardized quality at a certain date in the future. The future date is called the delivery date. The commodity is, in many cases, a non-traditional commodity, such as FX or other financial instruments. For financial instruments, the delivery date is often referred to as the maturity date or value date. The time to the delivery date or maturity date is known as the tenor of the contract.

There are a number of differences between an OTC market and an exchange-based market. OTC markets require that the counterparties accept each other's creditworthiness, whereas exchange based markets are generally centrally cleared and settled via an associated clearing house; the clearing firm acts as a counterparty and hence reduces credit risk for the counterparties. OTC markets allow non-standard contracts to be traded, assuming a selling counterparty can find a buying counterparty, and vice-versa, whereas an exchange allows only certain standardized contracts to be traded. Depending on market conditions, at any given time, there may be more liquidity in either the OTC market or the exchange-based market.

Because contracts-based clearing houses, such as clearing houses associated with futures exchanges, are already well established, and provide a number of advantages, it has previously been appreciated that integrating OTC-traded contracts into a contracts-based clearing regime may be desirable. Such integration may allow a trader to benefit from the execution advantages of the OTC market and the clearing and settling advantages of an exchange.

One example from the prior art, of such integration of an OTC product into a contracts-based clearing house is in the field of submitting OTC products into a futures clearing house for settlement. Traditionally, this has been done either by defining a futures contract for every business day that the OTC contract may be settled, or by restricting OTC submission to contract dates supported by the clearing house.

FX spot comprises buying one currency and selling a different currency for immediate, rather than future, delivery. The standard settlement timeframe for FX spot trades is S=T+2 business days, where S is the spot date and T is the date of trade execution, although settlement timeframes of T, and T+1 are also possible. An FX transaction which has a settlement date after the spot date is called an FX forwards contract. In the case of integrating FX OTC positions into a futures clearing regime, to include FX spot and FX forwards, this will mean defining a new futures contract for every currency-pair and business day over the next 3 to 5 years. This obviously requires a great deal of processing and storage, as well as daily maintenance to keep pace with the change of calendar dates.

There is therefore a need to provide an improved method and system for integrating OTC trades into a contracts-based clearing house.

SUMMARY OF THE INVENTION

According to one aspect of the invention, there is provided a method for conversion of OTC positions into contracts, each OTC position having a maturity date, each contract being clearable at a clearing house, the method comprising the steps of: a) defining a plurality of tenors, the plurality of tenors being fewer than the OTC maturity dates of the OTC positions; b) defining a contract, clearable at the clearing house, corresponding to each tenor defined in step a); c) mapping each OTC position, as it is executed, into one or more of the contracts, based on the maturity date of the OTC position; and d) between business days, re-mapping each contract mapped at step c) to account for the move of calendar day.

According to another aspect of the invention, there is provided a system, for connecting to a clearing house and to one or more OTC platforms, for conversion of OTC positions from the one or more OTC platforms, into contracts clearable at the clearing house, each OTC position having a maturity date, the system comprising: means for defining a plurality of tenors, the plurality of tenors being fewer than the OTC maturity dates of the OTC positions; means for defining a contract, clearable at the clearing house, corresponding to each defined tenor; means for mapping each OTC position, as it is executed on one of the OTC platforms, into one or more of the contracts, based on the maturity date of the OTC position; and means for re-mapping, between business days, each mapped contract, to account for the move of calendar day.

According to another aspect of the invention, there is provided a method in a computerized system for conversion of OTC positions from one or more OTC platforms, into contracts clearable at a computerized clearing house, each OTC position having a maturity date, the method comprising the steps of: defining, in a first computer processor, a plurality of tenors, the number of tenors being less than the number of OTC maturity dates of the OTC positions; defining, in a second computer processor, a contract clearable at the clearing house, corresponding to each defined tenor; mapping each OTC position, as it is executed on one of the OTC platforms, into one or more clearable contract positions, based on the maturity date of the OTC position; between business days, generating a contract position opposite to the mapped contract position, thereby cancelling out the mapped contract position, and generating a further clearable contract position based on the maturity date of the OTC position being one business day closer.

According to another aspect of the invention, there is provided a method in a computerized system for conversion of OTC FX positions from one or more OTC platforms, into standardized futures contracts processable at a traditional futures clearing house, each OTC FX position having a value date, the method comprising the steps of: defining, in a first computer processor, a plurality of tenors, the number of tenors being less than the number of OTC value dates of the OTC FX positions; defining, in a second computer processor, a standardized futures contract processable at the clearing house, corresponding to each defined tenor; mapping each OTC FX position, as it is executed on one of the OTC platforms, into one or more processable standardized futures contract positions, based on the value date of the OTC FX position; forwarding the mapped standardized futures contract positions to the clearing house; on change of business days, generating a futures contract position opposite to the mapped futures contract position, thereby closing out the mapped futures contract position, and generating a new processable standardized futures contract position based on the value date of the OTC position being one business day closer; and forwarding the generated new standardized futures contract positions to the clearing house.

According to another aspect of the invention, there is provided a computerized system, for cooperation with a computerized clearing platform and with one or more computerized OTC platforms, for conversion of OTC positions from the one or more computerized OTC platforms, into contracts clearable on the computerized clearing platform, each OTC position having a maturity date, the system comprising: a first computer processor for defining a plurality of tenors, the plurality of tenors being fewer than the OTC maturity dates of the OTC positions; a second computer processor for defining a contract, clearable on the computerized clearing platform, corresponding to each defined tenor; a computerized mechanism for mapping each OTC position, as it is executed on one of the computerized OTC platforms, into one or more of the contracts, based on the maturity date of the OTC position; and a computerized mechanism for re-mapping, between business days, each mapped contract, to account for the move of calendar day.

According to another aspect of the invention, there is provided a computerized system, for connecting to a computerized futures clearing house and to one or more computerized OTC platforms, for conversion of OTC FX positions from the one or more computerized OTC platforms, into futures contracts clearable at the computerized futures clearing house, each OTC FX position having a value date, the system comprising: a first computer processor for defining a plurality of tenors, the plurality of tenors being fewer than the OTC value dates of the OTC FX positions; a second computer processor for defining a standard futures contract, clearable at the computerized futures clearing house, corresponding to each defined tenor; a computerized mechanism for mapping each OTC FX position, as it is executed on one of the computerized OTC platforms, into one or more of the standard futures contracts, based on the value date of the OTC FX position; and a computerized mechanism for re-mapping, between business days, each mapped standard futures contract, to account for the move of calendar day.

According to another aspect of the invention, there is provided a method in a computerized clearing system for conversion of OTC FX spot positions from one or more OTC platforms, into standard futures contracts clearable at a computerized futures clearing house, each OTC FX spot position having a value date of the current business day, the day after the current business day or two days after the current business day, the method comprising the steps of: defining, in a computer processor, three tenors and three corresponding standard futures contracts clearable at the clearing house; mapping each OTC FX spot position having a value date of the current business day, as it is executed, to the first contract; mapping each OTC FX spot position having a value date of the day after the current business day, as it is executed, to the second contract; mapping each OTC FX spot position having a value date of two days after the current business day, as it is executed, to the third contract; at the end of the current business day, re-mapping each OTC FX spot position having a value date of the day after the current business day, which is a new business day, to the first contract; and at the end of the current business day, re-mapping each OTC FX spot position having a value date of two days after the current business day, which is one day after the new business day, to the second contract.

According to another aspect of the invention, there is provided a method in a computerized clearing system for conversion of OTC FX forwards positions from one or more OTC platforms, into standard futures contracts clearable at a computerized futures clearing house, each OTC FX forwards position having a future value date, the method comprising the steps of: a) defining, in a computer processor, x tenors and x corresponding standard futures contracts clearable at the clearing house, wherein x is a predefined number determined from the number and spread of value dates of the OTC FX forwards positions; b) weighting each OTC FX forwards position between two of the x contracts, based on the point in time of the OTC FX forwards position's future value date relative to the point in time, with respect to the current business day, of the tenor corresponding to the first of the two of the x contracts and the point in time, with respect to the current business day, of the tenor corresponding to the second of the two of the x contracts; c) mapping a first portion of the OTC FX forwards position into the first contract, based on the weighting of the first contract; d) mapping a second portion of the FX forwards position into the second contract, based on the weighting of the second contract, wherein the sum of the first and second portions equals the whole FX forwards position; and e) at the end of the current business day, before a new business day, repeating steps b), c) and d) for the new business day.

Embodiments of the invention have the advantage of reducing the number of contracts, clearable at the clearing house, that need to be defined.

Embodiments of the invention have the advantage of reducing the amount of management of contracts required.

Embodiments of the invention have the advantage that there is no effect on mark-to-market position.

Embodiments of the invention have the advantage that a market participant's outstanding notional position is not affected.

Embodiments of the invention have the advantage that an existing contracts-based clearing house can be used for integration with OTC trades.

BRIEF DESCRIPTION OF DRAWINGS

Embodiments of the invention will now be described, by way of example only and with reference to accompanying FIG. 1, which is a schematic view of an embodiment of the system of the invention.

DESCRIPTION OF PREFERRED EMBODIMENTS

The system embodying the invention is arranged to convert OTC products into standardized contracts, which are clearable at a contracts-based clearing house. The OTC product may be any suitable product which defines a number of maturity dates, which may include the current business date and a number of future dates. The contracts-based clearing house may be any suitable clearing house in which a number of standardized contracts are defined and clearable between counterparties.

In the following examples, the OTC product is OTC FX, in the form of OTC FX spot and OTC FX forwards, and the contracts-based clearing house is a futures clearing house for clearing futures contracts. However, any suitable OTC product and contracts-based clearing house may be used with the system and method of the invention.

FIG. 1 shows an embodiment of the system of the invention. As shown, the system 101 is in communication with clearing house 103 and with a plurality of OTC systems, shown generally at 105. The system 101 comprises first processor 107, second processor 109, mapping mechanism 111 and cost-of-carry calculator 113, whose functions will be further described below.

In this embodiment, clearing house 103 is a futures clearing house for clearing standardized futures contracts. Each of those futures contracts has a defined maturity date, which is one of a plurality of possible maturity dates specified by the clearing house. In this embodiment, the OTC information input into the system 101 is provided by a number of different OTC systems, individuals who may act as brokers, or any other platform which can provide information about OTC trades. In this embodiment, the OTC trades are OTC FX trades, both FX spot and FX forwards. Other FX trades, such as FX swaps, FX options, are also possible.

Processor 107 is arranged to define a plurality of tenors, that is, time-to-maturity dates. The number of tenors defined will depend on a number of factors, including the number and spread of maturity dates of the actual OTC FX trades, and this is discussed further below. The maturity date may be expressed as T+t, where T is the trade execution date and t is the tenor.

FX spot comprises buying one currency for another currency for immediate, rather than future, delivery. The standard settlement timeframe for FX spot trades, that is, the maturity date, is S=T+2 business days, where S is the spot date. A notable exception is the USD-CAD currency pair, which settles at T+1 business day. Thus, for the purposes of FX spot, it is preferable to define three tenors: T, T+1 business day, T+2 business days. Any tenor is relative to the current spot date (that is S=T+2 business days), but when taken in the context of FX, the maturity date must always fall on a valid clearing day for both currencies involved. For example, if the current business date is Thursday 16 Oct. 2008, the standard settlement time for FX spot trades executed today will be Monday 20 Oct. 2008, since 18 Oct. 2008 falls on a Saturday and the next available business date is Monday. Similarly, a trade executed on Friday 17 Oct. 2008 will have a standard settlement date of Tuesday 21 Oct. 2008.

FX forwards comprises buying one currency for another currency for future delivery. Any future maturity date i.e. any date after the spot date, may be defined, according to the requirements of the two parties involved in the trade. Typically however, the maturity dates for FX forwards are within the next 3 to 5 years. For example, 3 months (S+3 months) is a valid tenor. Again, any tenor is relative to the current spot date, but when taken in the context of FX, the maturity date must always fall on a valid clearing day for both currencies involved. For example, if today is Wednesday 22 Oct. 2008, the spot date (that is T+2 days) is Friday 24 Oct. 2008. Thus, the 3-month tenor for GBP-USD is Monday 26 Jan. 2009, since 24 Jan. 2009 falls on a Saturday and the 3-month tenor adjusts to the next business day. For the purposes of FX forwards, any number of tenors may be defined, generally falling within the next 3 to 5 years or thereabouts. The number of tenors defined will be discussed below.

Processor 109 is arranged to define a standardized contract for each tenor defined in processor 107. The particular contract defined for each tenor is not important—it is only important that there is a one-to-one correlation between tenor in 107 and contract in 109, and that the standardized contracts defined are clearable at clearing house 103. Thus, in this case, the standardized contracts are futures contracts having a maturity date that is standard to futures clearing house 103. It is preferable that there is some sort of logical correlation between each tenor and its corresponding futures contract, although this is not necessary.

In the case of a futures clearing house, it is preferable that the standardized futures contracts defined have maturity dates that are a long way in the future. This is so that there is no chance that the futures contracts will expire imminently. Nor will they require constant maintenance. Because of this, the futures contracts may be referred to as "perpetual futures contracts", since the expiry date is so far away that the futures contract is effectively everlasting i.e. perpetual. An expiry year of, for example, 2099 may be suitable. Because the actual maturity dates need to be acceptable to the clearing house and related clearing systems, these will typically be defined using the standard maturity months of March, June, September and December (or other standard maturity dates as defined by the clearing house). For example December 2099 would be a suitable maturity date.

Mapping mechanism 111 is arranged to convert the actual open positions of the OTC products traded at 105, into positions in the standardized futures contracts defined by processor 109 and clearable at clearing house 103. Mapping mechanism 111 has two functions: 1) to map, in real-time, each incoming open position, as trades are being executed at 105, and 2) to perform a re-map at the end of each business day to account for the move forward one calendar day. Mapping mechanism 111 works in conjunction with calculator 113. Calculator 113 provides information for the mapping mechanism regarding cost-of-carry which is required when mapping mechanism rolls over FX spot positions to the next business day. Cost-of-carry can be thought of as the cost to a party for maintaining a given position over time. This will be discussed further below.

Mapping mechanism 111 stores a record of each tenor and the futures contract to which it is mapped. At the end of each business day, the maturity date of the underlying FX position is one day closer, so the mapping to the futures contracts must be redefined. Note, however, that the maturity date of the corresponding futures contract is fixed i.e. it is always defined with respect to the current business day. The mapping for FX spot and FX forwards will now be described.

Mapping for FX Spot

For FX spot, three tenors are defined in processor 107: T, T+1 business day, T+2 business days, that is, settlement on the current business day, settlement in one business day, and settlement in two business days. So, three standardized futures contracts are defined in processor 109. In one example, the three standardized futures contracts are June 2099 (Jun099), corresponding to the current business day, T, September 2099 (Sep099), corresponding to T+1 business day, and December 2099 (Dec099), corresponding to T+2 business days (which is equal to the spot date, S). Any suitable futures contracts may be defined in processor 109, as long as they are clearable at clearing house 103 and are preferably perpetual.

Mapping mechanism 111 then maps each OTC FX spot trade, in real-time as it is executed, into the corresponding futures contract. For FX spot, this is a relatively straightforward one-to-one map. Thus, FX trades for settlement on the current business day (also known as cash settlement) are mapped to Jun099 contracts in clearing house 103, FX trades for settlement in one business day (such as a USD-CAD FX spot trade) are mapped to Sep099 contracts in clearing house 103, and FX trades for settlement in two business days (such as a GBP-USD FX spot trade) are mapped to Dec099 contracts in clearing house 103.

Mapping mechanism 111 also re-maps each outstanding FX spot position at the end of each business day. Trades resulting in positions having a tenor T have already been settled with resulting profit or loss paid or received so all positions and money balances are zero (not outstanding). Trades having a tenor T+1 business day must now be settled on the current business day (since we have moved forward one calendar day) so now map to Jun099, with account taken of the cost-of-carry, as calculated at 113, for the change of business day. Trades having a tenor T+2 business days must now be settled in one business day (since we have moved forward one calendar day) so now map to Sep099, with account taken of the cost-of-carry, as calculated at 113, for the change of business day.

Mapping mechanism 111 performs this re-map by generating new positions at clearing house 103. Firstly, the mapping mechanism generates a new position to offset each outstanding position. For each outstanding position, a position equal to the reverse net position of the corresponding futures contract is generated. The reverse position is exactly the same as the original mapped position (except for the direction), so that the outstanding position is completely neutralized. Secondly, the mapping mechanism generates new positions corresponding to the original outstanding positions, but for the next business day. The new positions incorporate a new spot basis and the cost-of-carry, from calculator 113, for the elapsed time between the original date and the next business day. This accounts for the move forward one calendar day. For each original position, a new position is generated.

In the case of FX spot, this is equivalent to the mapping mechanism simply generating a swap between one value date and the next. This maintains the net position. Overall, the mapping mechanism produces an average of buys swaps and an average of sells swaps between the contracts corresponding to the two value dates. The average of buys and sells are processed separately to allow for cases where market participants may have locked in profit or loss on a position, closing out the position in the OTC market, but still requiring management at the clearing house to coordinate cash settlement on the appropriate contract day as determined by the delivery date of the OTC contract.

Of course, on the next business day, new trades are also being received from 105 so that any new FX trade having tenor T, also maps to Jun099. In addition, any new settlement tomorrow, T+1, trades also map to Sep099. New T+2 trades map to Dec099.

Note that, during the mapping and re-mapping, the maturity date of the underlying FX position is fixed.

Mapping for FX Forwards

For FX forwards, any suitable number x of tenors is defined in processor 107. And, a corresponding number of standardized futures contracts is defined in processor 109.

For FX forwards, or any other longer dated activity, the mapping in mapping mechanism 111 is not a simple one-to-one mapping. Each OTC FX forwards trade is weighted into a portion of a first, near tenor and a portion of a second, far tenor, the relative portions depending on the position in time of the OTC FX forwards maturity date compared with the positions in time of the near and far tenors. For a linear system:

$$FuturesContract_{NearTenor} = 1 - \frac{t_{FXforward} - t_{NearTenor}}{t_{FarTenor} - t_{NearTenor}} \quad (1)$$

$$FuturesContract_{FarTenor} = 1 - \frac{t_{FarTenor} - t_{FXforward}}{t_{FarTenor} - t_{NearTenor}} \quad (2)$$

where:
$FuturesContract_{NearTenor}$ is the percentage weighting into the futures contract corresponding to the near tenor,
$FuturesContract_{FarTenor}$ is the percentage weighting into the futures contract corresponding to the far tenor,
$t_{FarTenor}$ is the time to the far tenor maturity date (normally defined in days),
$t_{NearTenor}$ is the time to the near tenor maturity date (again, normally defined in days), and
$t_{FXForward}$ is the time to the OTC FX forward trade maturity date (again, normally defined in days).

As with FX spot, the maturity date of the underlying FX position (T+$t_{FXForward}$) is fixed (T has a particular date), but the mapping to the corresponding futures contract(s) (T+$t_{FarTenor}$ and T+$t_{NearTenor}$) float i.e. they are always defined with respect to the current business day (T always equals today).

$$FuturesContract_{FarTenor} + FuturesContract_{NearTenor} = 1 = 100\% \quad (3)$$

since each OTC FX forwards trade is completely weighted between the two tenors and hence between the two futures contracts.

Thus, if the OTC FX forwards trade has a maturity date of T+135 days where T is the current business day, and the near tenor is T+90 days, and the far tenor is T+180 days, from Equation (1):

$$FuturesContract_{NearTenor} = 1 - \frac{135 - 90}{180 - 90} = 0.5 = 50\%$$

and from Equation (2):

$$FuturesContract_{FarTenor} = 1 - \frac{180 - 135}{180 - 90} = 0.5 = 50\%$$

Because the FX forward has been split into two fixed futures contracts, there is now no need to define and manage a contract on the 145$^{th}$ day, 144$^{th}$ day, 143$^{rd}$ day etc of life of the FX forward contract.

So, mapping mechanism 111 maps each OTC FX forwards trade, as it is executed, into the corresponding futures contract(s). If the maturity date of the OTC FX forwards position falls between two of the tenors defined in processor 107, the trade will map to two corresponding futures contracts in accordance with Equations (1) and (2). If the maturity date of the OTC FX forwards trade falls exactly on one of the tenors defined in processor 107, the trade will map to one corresponding futures contract. This is because one of Equations (1) and (2) will be equal to 0, the other equal to 1.

Mapping mechanism 111 also re-maps each outstanding FX forwards position at the end of each business day. This accounts for the move forward one calendar day. That is, the position in time of the OTC FX forwards maturity date compared with the positions in time of the near and far tenors changes, so the weighting defined by Equations (1) and (2) changes.

For the FX forwards trade discussed above, which has a maturity date of T+135 days, where T is now yesterday, from Equation (1):

$$FuturesContract_{NearTenor} = 1 - \frac{134 - 90}{180 - 90} = 0.511 = 51.1\%$$

and from Equation (2):

$$FuturesContract_{FarTenor} = 1 - \frac{180 - 134}{180 - 90} = 0.489 = 48.9\%$$

That is, the outstanding OTC position is now more heavily weighted towards the near tenor. This is expected, as the maturity date of OTC position is now closer in time to the near tenor than to the far tenor.

Mapping mechanism 111 performs this re-map by generating new positions to the clearing house 103. Firstly, the mapper generates one or more positions to offset each outstanding position. For each outstanding position, two positions may be generated: a position equal to the reverse position of the futures contract corresponding to the near tenor is generated, and a position equal to the reverse position of the futures contract corresponding to the far tenor is generated. Clearly, if the maturity date of the outstanding OTC position falls exactly on either of the near and far tenors, only one reverse position will need to be generated, as the other will be equal to zero.

The reverse positions are exactly the same as the original mapped positions (except for the direction), so that the outstanding position is completely neutralized. Secondly, the mapping mechanism generates new positions corresponding to the original outstanding positions, but weighted for the next business day. This maintains the net position.

Once the FX forward's value date converges to spot, it can be incorporated into the FX spot positions. That is, once the FX forwards value date becomes equal to T+2 business days, it becomes an FX spot position.

As already discussed, for FX forwards (and other future dated activity), the number of contracts defined depends on the number and spread of value dates of the original OTC positions. Clearly, if more contracts are defined, the weighting and mapping will be more straightforward and the number of positions to be mapped will be reduced. On the other hand, if fewer contracts are defined, this may be more straightforward in terms of number of contracts, but the number of positions created will be greater. Thus, there is a trade off between the number of futures contracts and the volume of positions the mapping will generate. The deciding factor will be the reconciliation requirements between the computer systems at the clearing house and the computer systems managing the perpetual futures.

Example 1

In the following example, the OTC product is FX spot, and the clearing house is a futures clearing house.

Day 1—Oct. 20, 2008:

The opening position on 20 Oct. 2008 is zero, so:

TABLE 1a

Opening Position on 20 Oct. 2008

| OTC position | | | | Futures |
| --- | --- | --- | --- | --- |
| EUR Amount | Rate | USD Amount | Maturity Date | position |
| 0 | — | 0 | — | — |

On 20 Oct. 2008, a trader buys FX spot 1,000,000 EUR-USD at a rate of 1.365. That is:

TABLE 1b

Activity on 20 Oct. 2008

OTC position

| Current Business Date | EUR Amount | Rate | USD Amount | Maturity Date | Futures position |
| --- | --- | --- | --- | --- | --- |
| 20 OCT. 2008 | +1 million | 1.365 | −1.365 million | 22 OCT. 2008 | +Dec099 |

At the end of the business day on 20 Oct. 2008, the closing EUR-USD rate is 1.385 which gives an OTC mark-to-market surplus equity of (i.e. credit) of USD 20,000, in order to leave the trader's notional position unaffected. This is the margin requirement at the clearing house in order to account for the value of the position if it were liquidated now. Thus, the closing position at the end of the business day, is:

TABLE 1c

Closing Position on 20 Oct. 2008

| OTC position | | | | OTC mark-to-market equity/deficit | Futures position |
| --- | --- | --- | --- | --- | --- |
| EUR Amount | Rate | USD Amount | Maturity Date | | |
| +1 million | 1.365 | −1.365 million | 22 OCT. 2008 | +USD 20,000 | +Dec099 |

At the change of the business day, the following positions are generated by the mapping mechanism:

TABLE 1d

Generated Positions on change of business date from 20 Oct. 2008 to 21 Oct. 2008

OTC position

| Current Business Date | EUR Amount | Rate | USD Amount | Maturity Date | Futures position |
| --- | --- | --- | --- | --- | --- |
| 20 OCT. 2008 | −1 million | 1.365 | +1.365 million | 22 OCT. 2008 | −Dec099 |
| 21 OCT. 2008 | +1 million | 1.365 | −1.365 million | 22 OCT. 2008 | +Sep099 |

The first generated position in Table 1d offsets the +Dec099 closing position in Table 1c, and the second generated position re-maps the original position into a +Sep099 position, since the date has moved forward one calendar day from spot (S=T+2) to tomorrow (T+1).

Thus, combining the closing positions in Table 1c with the generated positions in Table 1d, gives:

TABLE 1e

| End of Day view on 20 Oct. 2008 | |
| --- | --- |
| OTC Maturity date | Futures |
| 22 OCT. 2008: | Sep099 |
| EUR +1 million | +1 million |
| USD −1.365 million | −1.365 million |
| 23 OCT. 2008: | Dec099 |
| EUR 0 | 0 |
| USD 0 | 0 |
| OTC Mark-to-market: +USD 20,000 | |

The only Sep099 position in Table 1e is the second generated position in Table 1d. The Dec099 position has been netted off to zero.

Day 2—Oct. 21, 2008:

The trader's opening position on 21 Oct. 2008 is shown.

TABLE 2a

Opening Position on 21 Oct. 2008

| | | OTC position | | Futures |
| --- | --- | --- | --- | --- |
| EUR Amount | Rate | USD Amount | Maturity Date | position |
| +1 million | 1.365 | −1.365 million | 22 OCT. 2008 | +Sep099 |

This is the closing position on 20 October (Table 1c) combined with the generated positions (Table 1d), that is, the position shown in Table 1e. As already mentioned, the trader has a futures margin requirement, which will be reflected as surplus equity in the OTC market, of USD 20,000, to ensure no mark-to-market change. Unlike futures variation margin settlements daily, OTC markets will reflect increase or decrease in equity with actual cash flows resulting from mark-to-market taking place on the delivery date of the OTC contract. Minimum equity requirements will dictate potential risk management processes.

On 21 Oct. 2008, the trader rolls his currency position in the FX OTC market forward to spot, less interest (cost-of-carry) charges for carrying a position overnight. This is effectively selling FX next-day-delivery 1,000,000 EUR-USD at a rate of 1.3975 and buying FX spot 1,000,000 EUR-USD at a rate of 1.398. That is:

TABLE 2b

Activity on 21 Oct. 2008

| | | OTC position | | | |
| --- | --- | --- | --- | --- | --- |
| Current Business Date | EUR Amount | Rate | USD Amount | Maturity Date | Futures position |
| 21 OCT. 2008 | −1 million | 1.3975 | +1.3975 million | 22 OCT. 2008 | −Sep099 |
| 21 OCT. 2008 | +1 million | 1.398 | −1.398 million | 23 OCT. 2008 | +Dec099 |

At the end of the business day on 21 Oct. 2008, the closing EUR-USD rate is 1.4, which gives the OTC mark-to-market surpluses shown in Table 2c. Thus, the closing position at the end of the business day, is:

TABLE 2c

Closing Position on 21 Oct. 2008

| OTC position | | | | | |
| --- | --- | --- | --- | --- | --- |
| EUR Amount | Rate | USD Amount | Maturity Date | OTC mark-to-market equity/deficit | Futures position |
| +1 million | 1.365 | −1.365 million | 22 OCT. 2008 | +USD 35,000 | +Sep099 |
| −1 million | 1.3975 | +1.3975 million | 22 OCT. 2008 | −USD 2,500 | −Sep099 |
| +1 million | 1.398 | −1.398 million | 23 OCT. 2008 | +USD 2,000 | +Dec099 |
| | | | TOTAL: | +USD 34,500 | |

This is the opening position on 21 Oct. 2008 (Table 2a) combined with the day's activity (Table 2b). At the end of the business day on 21 Oct. 2008, the following positions are generated by the mapping mechanism:

TABLE 2d

Generated Positions on change of business date from 21 Oct. 2008 to 22 Oct. 2008

| | | OTC position | | | |
| --- | --- | --- | --- | --- | --- |
| Current Business Date | EUR Amount | Rate | USD Amount | Maturity Date | Futures position |
| 21 OCT. 2008 | −1 million | 1.365 | +1.365 million | 22 OCT. 2008 | −Sep099 |
| 22 OCT. 2008 | +1 million | 1.365 | −1.365 million | 22 OCT. 2008 | +Jun099 |
| 21 OCT. 2008 | +1 million | 1.3975 | −1.3975 million | 22 OCT. 2008 | +Sep099 |
| 22 OCT. 2008 | −1 million | 1.3975 | +1.3975 million | 22 OCT. 2008 | −Jun099 |
| 21 OCT. 2008 | −1 million | 1.398 | +1.398 million | 23 OCT. 2008 | −Dec099 |
| 22 OCT. 2008 | +1 million | 1.398 | −1.398 million | 23 OCT. 2008 | +Sep099 |

The first generated position in Table 2d offsets the +Sep099 closing position in Table 2c, and the second generated position re-maps that position into a +Jun099 position, since we have moved forward one calendar day. Similarly, the third generated position offsets the −Sep099 closing position, and the fourth generated position re-maps that position into a −Jun099 position. Finally, the fifth generated position offsets the +Dec099 closing position, and the sixth generated position re-maps that position into a +Sep099 position.

Thus, combining the closing positions in Table 2c with the generated positions in Table 2d, gives:

TABLE 2e

| End of Day view on 21 Oct. 2008 | |
| --- | --- |
| OTC Maturity date | Futures |
| 22 OCT. 2008: | Jun099 |
| EUR 0 | 0 |
| USD +32,500 | +32,500 |
| 23 OCT. 2008: | Sep099 |
| EUR +1 million | +1 million |
| USD −1.398 million | −1.398 million |
| 24 OCT. 2008: | Dec099 |

TABLE 2e-continued

End of Day view on 21 Oct. 2008

| OTC Maturity date | Futures |
|---|---|
| EUR 0 | 0 |
| USD 0 | 0 |
| OTC Mark-to-market: +USD 34,500 | |

The resulting Jun099 position in Table 2e is the net of the Jun099 positions in Table 2d i.e. the second and fourth generated positions. There is no Jun099 position in Table 2c. The resulting Sep099 position in Table 2e is the net of the Sep099 position in Table 2c and the Sep099 positions in Table 2d i.e. the first, third and sixth generated positions. The resulting Dec099 position in Table 2e is the net of the Dec099 position in Table 2c and the Dec099 position and Dec099 position in Table 2d i.e. the fifth generated position.

Day 3—Oct. 22, 2008:

The trader's opening position on 22 Oct. 2008 is shown.

TABLE 3a

Opening Position on 22 Oct. 2008

| | | OTC position | | Futures |
|---|---|---|---|---|
| EUR Amount | Rate | USD Amount | Maturity Date | position |
| +1 million | 1.365 | −1.365 million | 22 OCT. 2008 | +Jun099 |
| −1 million | 1.3975 | +1.3975 million | 22 OCT. 2008 | −Jun099 |
| +1 million | 1.398 | −1.398 million | 23 OCT. 2008 | +Sep099 |

This is the closing position on 21 Oct. 2008 (Table 2c) combined with the generated positions (Table 2d), that is, the position shown in Table 2e. As already mentioned, the trader has a futures margin requirement, which will be reflected as surplus equity in the OTC market, of USD 34,500.

On 22 Oct. 2008, the trader rolls his currency position in the FX OTC market forward to spot, less interest (cost-of-carry) for carrying a position overnight. This is effectively selling FX next-day-delivery 1,000,000 EUR-USD at a rate of 1.385 and buying FX spot 1,000,000 EUR-USD at a rate of 1.3855. That is:

TABLE 3b

Activity on 22 Oct. 2008

| | | | OTC position | | |
|---|---|---|---|---|---|
| Current Business Date | EUR Amount | Rate | USD Amount | Maturity Date | Futures position |
| 22 OCT. 2008 | −1 million | 1.385 | +1.385 million | 23 OCT. 2008 | −Sep099 |
| 22 OCT. 2008 | +1 million | 1.3855 | −1.3855 million | 24 OCT. 2008 | +Dec099 |

At the opening of the day, the Jun099 position must be closed out to zero, since this corresponds to settlement today, so cannot be outstanding at the end of the day, when new trades are generated to account for the calendar date change. From Table 2e, the outstanding Jun099 position has a money only balance of USD 32,500. The clearing house will pay and receive all appropriate money only balances, in this case physically transferring USD 32,500. Thus, there is a creation of money movement on the original OTC value date.

At the end of the business day on 22 Oct. 2008, the closing EUR-USD rate is 1.39, which gives the OTC mark-to-market surpluses shown in Table 3c. Thus, the closing position at the end of the business day, is:

TABLE 3c

Closing Position on 22 Oct. 2008

| | | OTC position | | | |
|---|---|---|---|---|---|
| EUR Amount | Rate | USD Amount | Maturity Date | OTC mark-to-market equity/deficit | Futures position |
| +1 million | 1.398 | −1.398 million | 23 OCT. 2008 | −USD 8,000 | +Sep099 |
| −1 million | 1.385 | +1.385 million | 23 OCT. 2008 | −USD 5,000 | −Sep099 |
| +1 million | 1.3855 | −1.3855 million | 24 OCT. 2008 | +USD 4,500 | +Dec099 |
| | | | | TOTAL: | |
| | | | | −USD 8,500 | |

This is the opening position on 22 Oct. 2008 (Table 3a) combined with the day's activity (Table 3b), less the Jun099 settled position. At the end of the business day on 22 Oct. 2008, the following positions are generated by the mapping mechanism:

TABLE 3d

Generated Positions on change of business date from 22 Oct. 2008 to 23 Oct. 2008

| | | | OTC position | | |
|---|---|---|---|---|---|
| Current Business Date | EUR Amount | Rate | USD Amount | Maturity Date | Futures position |
| 22 OCT. 2008 | −1 million | 1.398 | +1.398 million | 23 OCT. 2008 | −Sep099 |
| 23 OCT. 2008 | +1 million | 1.398 | −1.398 million | 23 OCT. 2008 | +Jun099 |
| 22 OCT. 2008 | +1 million | 1.385 | −1.385 million | 23 OCT. 2008 | +Sep099 |
| 23 OCT. 2008 | −1 million | 1.385 | +1.385 million | 23 OCT. 2008 | −Jun099 |
| 22 OCT. | −1 million | 1.3855 | +1.3855 million | 24 OCT. 2008 | −Dec099 |
| 23 OCT. | +1 million | 1.3855 | −1.3855 million | 23 OCT. 2008 | +Sep099 |

The first generated position in Table 3d offsets the +Sep099 closing position in Table 3c, and the second generated position re-maps that position into a +Jun099 position, since we have moved forward one calendar day. Similarly, the third generated position offsets the −Sep099 closing position, and the fourth generated position re-maps that position into a −Jun099 position. Finally, the fifth generated position offsets the +Dec099 closing position, and the sixth generated position re-maps that position into a +Sep099 position.

Thus, combining the closing positions in Table 3c with the generated positions in Table 3d, gives:

TABLE 3e

End of Day view on 22 Oct. 2008

| OTC Maturity date | Futures |
|---|---|
| 23 OCT. 2008: | Jun099 |
| EUR 0 | 0 |
| USD −13,000 | −13,000 |
| 24 OCT. 2008: | Sep099 |
| EUR +1 million | +1 million |
| USD −1.385 million | −1.385 million |
| 25 OCT. 2008: | Dec099 |
| EUR 0 | 0 |
| USD 0 | 0 |
| OTC Mark-to-market: −USD 8,500 | |

The resulting Jun099 position in Table 3e is the net of the Jun099 positions in Table 3d i.e. the second and fourth generated positions. There is no Jun099 position in Table 3c. The resulting Sep099 position in Table 3e is the net of the two Sep099 positions in Table 3c and the three Sep099 positions in Table 3d i.e. the first, third and sixth generated positions. The resulting Dec099 position in Table 3e is the net of the Dec099 position in Table 3c and the Dec099 position in Table 3d i.e. the fifth generated position Example 2

In the following example, the OTC product is FX forwards, and the clearing house is a futures clearing house.
Day 1—Oct. 27, 2008:
The opening position on 27 Oct. 2008 is zero, so:

TABLE 4a

Opening Position on 27 Oct. 2008

| OTC Position | | | | |
|---|---|---|---|---|
| EUR Amount | Rate | USD Amount | Maturity Date | Futures position |
| 0 | — | 0 | — | — |

On 27 Oct. 2008, a trader buys FX forwards having a value date of 2 Mar. 2009 (126 days away) 1,000,000 EUR-USD at a rate of 1.378.

TABLE 4b

Activity on 27 Oct. 2008

| OTC Position | | | | | |
|---|---|---|---|---|---|
| Current Business Date | EUR Amount | Rate | USD Amount | Tenor | Futures position |
| 27 OCT. 2008 | +1 million | 1.378 | −1.378 million | 126 days | — |

In this example, the two closest defined tenors are the 90 day tenor which maps to +Jun098 and the 180 day tenor which maps to +Sep098. Using Equation (1), gives a FuturesContract$_{90dayTenor}$ weighting of 60% and using Equation (2), gives FuturesContract$_{180dayTenor}$ weighting of 40%.

That is:

TABLE 4c

Activity (weighted) on 27 Oct. 2008

| OTC Weighting | | | | | |
|---|---|---|---|---|---|
| Current Business Date | EUR Amount | Rate | USD Amount | Tenor | Futures position |
| 27 OCT. 2008 | +600,000 | 1.378 | −826,800 | 90 day | +Jun098 |
| 27 OCT. 2008 | +400,000 | 1.378 | −551,200 | 180 day | +Sep098 |

Thus, the closing position at the end of the business day, is:

TABLE 4d

Closing Position on 27 Oct. 2008

| OTC Weighting | | | | |
|---|---|---|---|---|
| EUR Amount | Rate | USD Amount | Tenor | Futures position |
| +600,000 | 1.378 | −826,800 | 90 day | +Jun098 |
| +400,000 | 1.378 | −551,200 | 180 day | +Sep098 |

At the end of the business day on 27 Oct. 2008, the mapping mechanism re-weights the trades to account for the move forward one calendar day. Using Equation (1), gives a FuturesContract$_{90dayTenor}$ weighting of 61.1% and using Equation (2), gives FuturesContract$_{180dayTenor}$ weighting of 38.9%. Thus, the following positions are generated by the mapping mechanism:

TABLE 4e

Generated Positions on change of business date from 27 Oct. 2008 to 28 Oct. 2008

| OTC Weighting | | | | | |
|---|---|---|---|---|---|
| Trade Date | EUR Amount | Rate | USD Amount | Tenor | Futures position |
| 27 OCT. 2008 | −600,000 | 1.378 | +826,800 | 90 day | −Jun098 |
| 27 OCT. 2008 | +611,000 | 1.378 | −841,958 | 90 day | +Jun098 |
| 27 OCT. 2008 | −400,000 | 1.378 | +551,200 | 180 day | −Sep098 |
| 27 OCT. 2008 | +389,000 | 1.378 | −536,042 | 180 day | +Sep098 |

The first generated position in Table 4e offsets the +Jun098 closing position in Table 4d, and the second generated position re-maps that position into a new +Jun098 position. Similarly, the third generated position in Table 4e offsets the +Sep098 closing position in Table 4d, and the fourth generated position re-maps that position into a new +Sep098 position.

Thus, it can be seen that there is no position having a tenor of 2 March, only tenors of 90 days and 180 days. This removes the need to manage a contract on the 126$^{th}$ day value date of 2 Mar. 2009.

Once the FX forward's value date converges to spot, it will be managed using the process outlined above in mapping for FX spot.

Many modifications to the embodiments are possible and will occur to those skilled in the art without departing from the invention which is defined by the following claims.

The invention claimed is:

1. A method for conversion of OTC positions into contracts, each OTC position having a maturity date, each contract being clearable at a clearing house, the method comprising:

a) defining a plurality of tenors, the plurality of tenors being fewer than the OTC maturity dates of the OTC positions;
b) defining a contract, clearable at the clearing house, corresponding to each tenor defined in step a);
c) mapping each OTC position with a processor, as it is executed, into one or more of the contracts, based on the maturity date of the OTC position; and
d) between business days, re-mapping each contract mapped at step c) to account for the move of calendar day.

2. The method of claim 1, wherein step d) for each contract, comprises generating a position cancelling the contract position mapped at step c) and generating a new position equal to the contract position mapped at step c) but based on the maturity date of OTC position being one business day closer.

3. The method of claim 2, further comprising adding the contract positions mapped at step c) to the generated contract positions to produce an opening position for the next business day.

4. The method of claim 1, further comprising, between business days, for each market participant, comparing the value of the contracts position mapped at step c) with the notional value of the contracts position mapped at step c) at close-of-business prices, and allocating the difference to the market participant as a margin requirement at the clearing house.

5. The method of claim 1, wherein the OTC positions comprise OTC spot positions and, for the OTC spot positions, step a) comprises defining three tenors and step b) comprises defining three corresponding contracts.

6. The method of claim 5 wherein step c) comprises:
mapping OTC positions having a maturity date equal to the current business day to the first tenor and the respective first contract;
mapping OTC positions having a maturity date equal to the day after the current business day to the second tenor and respective second contract; and
mapping OTC positions having a maturity date equal to two days after the current business day to the third tenor and respective third contract.

7. The method of claim 6, wherein step d) comprises, between the current business day and a new business day:
re-mapping OTC positions having a maturity date equal to the day after the current business day, which is equal to the new business day, to the first tenor and respective first contract; and
re-mapping OTC positions having a maturity date equal to two days after the current business day, which is equal to the day after the new business day, to the second tenor and respective second contract.

8. The method of claim 5, wherein the step of re-mapping the OTC spot positions includes accounting for a cost of maintaining each position for a calendar day.

9. The method of claim 1, wherein the OTC positions comprise OTC forwards positions and, for the OTC forwards positions, step a) comprises defining x tenors and step b) comprises defining x corresponding contracts, wherein x is a pre-defined number.

10. The method of claim 9, wherein x is determined by the number and spread of OTC maturity dates of the OTC positions.

11. The method of claim 9, wherein step c) comprises:
weighting each OTC position between two of the x contracts, based on the point in time of the OTC maturity date of the OTC position relative to the point in time, with respect to the current business day, of the tenor corresponding to the first of the two of the x contracts and the point in time, with respect to the current business day, of the tenor corresponding to the second of the two of the x contracts;
mapping a first portion of the OTC position into the first contract, based on the weighting of the first contract; and
mapping a second portion of the OTC position into the second contract, based on the weighting of the second contract, wherein the sum of the first and second portions equals the whole OTC position.

12. The method of claim 11, wherein step d) comprises, between the current business day and a new business day:
re-weighting each OTC position between the two of the x contracts, based on the point in time of the OTC maturity date of the OTC position relative to the point in time, with respect to the new business day, of the tenor corresponding to the first of the two of the x contracts and the point in time of the tenor, with respect to the new business day, corresponding to the second of the two of the x contracts;
re-mapping a new first portion of the OTC position into the first contract, based on the re-weighting of the first contract; and
re-mapping a new second portion of the OTC position into the second contract, based on the re-weighting of the second contract, wherein the sum of the new first and second portions equals the whole OTC position.

13. The method of claim 1, wherein the clearing house is a futures clearing house, and the contracts defined at step b) are futures contracts, each having a maturity date sufficiently far into the future that the futures contracts are effectively perpetual.

14. The method of claim 1, wherein the OTC positions are OTC foreign exchange (FX) positions.

15. A system, for connecting to a clearing house and to one or more OTC platforms, for conversion of OTC positions from the one or more OTC platforms, into contracts clearable at the clearing house, each OTC position having a maturity date, the system comprising:
one or more processors configured to:
define a plurality of tenors, the plurality of tenors being fewer than the OTC maturity dates of the OTC positions;
define a contract, clearable at the clearing house, corresponding to each defined tenor;
map each OTC position, as it is executed on one of the OTC platforms, into one or more of the contracts, based on the maturity date of the OTC position; and
re-map, between business days, each mapped contract, to account for the move of calendar day.

16. The system of claim 15, wherein the clearing house is for clearing futures contracts, each having a maturity date sufficiently far into the future that the futures contracts are effectively perpetual.

17. The system of claim 15, wherein the OTC positions are OTC foreign exchange (FX) positions.

18. A method in a computerized system for conversion of OTC positions from one or more OTC platforms, into contracts clearable at a computerized clearing house, each OTC position having a maturity date, the method comprising:
defining, in a first computer processor, a plurality of tenors, the number of tenors being less than the number of OTC maturity dates of the OTC positions;
defining, in a second computer processor, a contract clearable at the clearing house, corresponding to each defined tenor;

mapping each OTC position, as it is executed on one of the OTC platforms, into one or more clearable contract positions, based on the maturity date of the OTC position; and generating a contract position opposite to the mapped contract position, thereby cancelling out the mapped contract position, and generating a further clearable contract position based on the maturity date of the OTC position.

19. A computerized system, for cooperation with a computerized clearing platform and with one or more computerized OTC platforms, for conversion of OTC positions from the one or more computerized OTC platforms, into contracts clearable on the computerized clearing platform, each OTC position having a maturity date, the system comprising:

- a first computer processor for defining a plurality of tenors, the plurality of tenors being fewer than the OTC maturity dates of the OTC positions;
- a second computer processor for defining a contract, clearable on the computerized clearing platform corresponding to each defined tenor; and
- a processing unit for mapping each OTC position, as it is executed on one of the computerized OTC platforms, into one or more of the contracts, based on the maturity date of the OTC position, and for re-mapping, between business days, each mapped contract, to account for the move of calendar day.

20. A computerized system, for connecting to a computerized futures clearing house and to one or more computerized OTC platforms, for conversion of OTC FX positions from the one or more computerized OTC platforms, into futures contracts clearable at the computerized futures clearing house, each OTC FX position having a value date, the system comprising:

- a first computer processor for defining a plurality of tenors, the plurality of tenors being fewer than the OTC value dates of the OTC FX positions;
- a second computer processor for defining a standard futures contract, clearable at the computerized futures clearing house, corresponding to each defined tenor; and
- a processing unit for mapping each OTC FX position, as it is executed on one of the computerized OTC platforms, into one or more of the standard futures contracts, based on the value date of the OTC FX position, and for re-mapping, between business days, each mapped standard futures contract, to account for the move of calendar day.

21. The computerized system of claim 20, wherein the OTC FX positions include OTC FX spot positions and the system further comprises a calculator, in communication with the processing unit for re-mapping, for calculating the cost of maintaining each FX spot position for a calendar day.

* * * * *